Oct. 25, 1927.

J. H. MOSEL 1,646,552

DRIVING MECHANISM FOR TRACK LAYING VEHICLES

Filed April 23, 1923

Inventor
Joseph H. Mosel
by
Thurston Knot Hudson
attys

Patented Oct. 25, 1927.

1,646,552

UNITED STATES PATENT OFFICE.

JOSEPH H. MOSEL, OF LAKEWOOD, OHIO, ASSIGNOR TO THE LAKEWOOD ENGINEERING COMPANY, OF LAKEWOOD, OHIO, A CORPORATION OF OHIO.

DRIVING MECHANISM FOR TRACK-LAYING VEHICLES.

Application filed April 23, 1923. Serial No. 634,092.

The present invention relates to mechanism for driving the endless track of a track laying vehicle. The object of the invention is to provide a simple mechanism by which the driving is secured at a plurality of speeds, and additionally whereby the vehicle may be conveniently steered.

Figure 1:
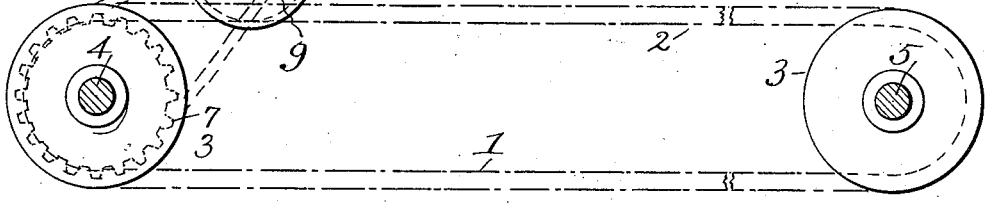
Figure 2:
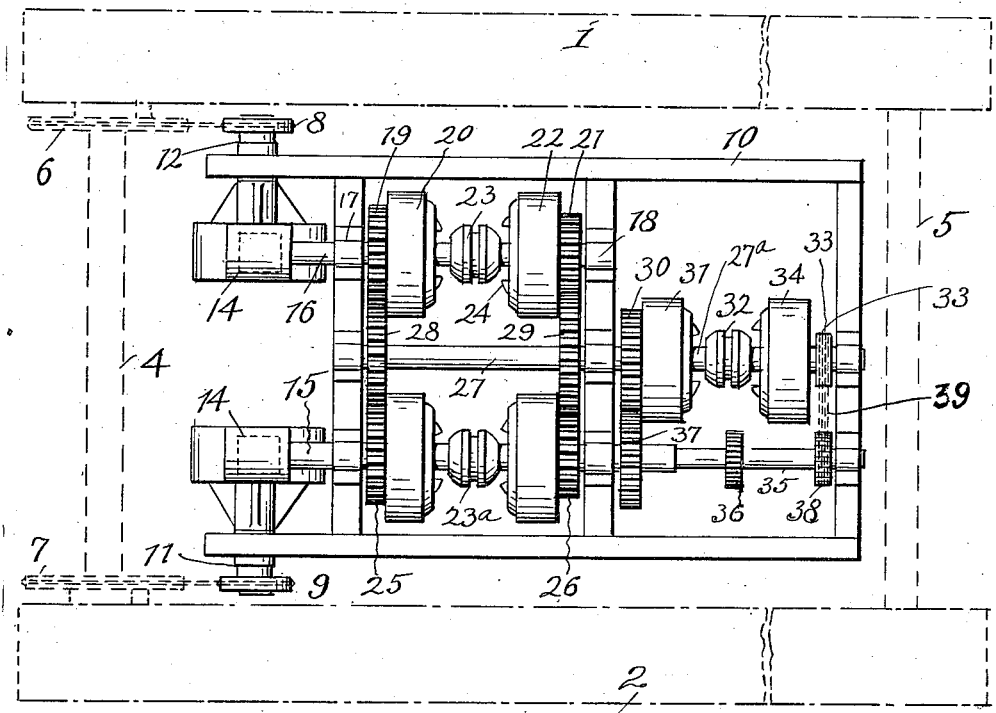

Reference should be had to the accompanying drawings, in which Fig. 1 is a side elevation of a portion of a vehicle showing the driving mechanism; Fig. 2 is a top plan view of the driving mechanism.

Referring to the drawings, 1 indicates an endless track member on one side of a vehicle, and 2 represents an endless track member on the opposite side of a vehicle. These track members at their end portions are mounted upon suitable inside roller members, such as indicated at 3, being connected at a given end by means of a shaft, such as shafts 4 and 5, upon one or both of the shafts, for instance the shaft 4, there are two sprocket members 6 and 7 which are adapted to receive sprocket chains which are connected with sprocket chains 8 and 9 respectively.

Suitably mounted upon the frame of the vehicle is a sub-frame which may be generally represented at 10. At one of the ends of the frame 10 there are two transversely extending shafts 11 and 12 which operate the sprocket members 9 and 8 respectively. At the end of each of these shafts there is a worm gear, such as indicated at 13, each worm gear being driven by a worm wheel, such as indicated at 14. Each worm gear is carried by a shaft, the worm gear 14 being shown as carried by the shaft 15, while the opposite worm gear would be carried by a shaft 16. This shaft 16 is mounted in bearings 17 and 18 which are supported by cross nembers of the frame 10, and upon the shaft 16 there are loosely mounted a gear member 19, to which is attached a clutch mechanism 20, and at the opposite end of the shaft there is a gear member 21 to which is secured a clutch member 22. On the shaft 16 and splined thereto so that it may slide is a clutch operating member 23. This clutch operating member when slid in one direction engages with movable fingers which are indicated at 24 in Fig. 1, which will cause the clutch mechanism 22 to clutch the shaft 16 so that the gear 21 will turn with the shaft. Movement of the number 23 in the opposite direction accomplishes the same result with respect to the gear 19. These clutch mechanisms may be of any desired type or kind, and their showing in this application is largely conventional.

Upon the shaft 15 there is a gear 25 which is of the same size and number of gear teeth as the gear 19, and similarly at the opposite end of the shaft 15 there is a gear 26 which is of the same diameter and having the same number of teeth as the gear 21.

Extending parallel with the shafts 15 and 16 is a shaft 27 which is journalled in cross members of the frame 10. This shaft has secured thereto a gear 28 which meshes with the gears 25 and 19, and a gear 29 of larger diameter which meshes with the gears 21 and 26. The shaft 27 is a driven shaft, and inasmuch as the gears 28 and 29 are secured to it, and further inasmuch as these gears are in mesh with the gears 19 and 25 and 21 and 26, the last mentioned gears will be turned when the shaft 27 is driven.

If the operating clutch member, such as that indicated at 23 and 23ª are moved in what may be termed a forward direction the gears 19 and 25 will be clutched to their respective shafts 16 and 15, which will cause these shafts to be driven and these shafts will impart motion to the sprockets 8 and 9, and so drive the larger sprockets 6 and 7 and cause movement of the track laying belts. This will cause the tractor to move forward at a given speed.

If, on the other hand, the clutch operating members 23, 23ª are moved in the opposite direction it will cause the gears 21 and 26 to be connected with the shafts 15 and 16 respectively, and these shafts will be driven at a higher rate of speed than they were when the gears 19 and 25 were connected to the shafts, as previously explained. This will also cause a driving of the sprockets connected with the track laying members so as to move the vehicle forwardly.

If it be desired to steer the vehicle the same may be accomplished in two ways. If it is desired to cause the vehicle to move toward the right the clutch member 23 may be moved to its neutral position and the clutch member 23ª moved either into position to cause the gear 25 to drive the shaft 15, or to cause the gear 26 to drive the shaft 16. On the other hand, the same result in kind, although at a different relative speed, may be attained by moving the clutch member 23ª so as to clutch the gear 26 to the shaft 15 and at the same time move the clutch member 23 so as to clutch the gear 19 to the shaft 16.

Under these conditions both of the track laying members 1 and 2 are driven but the track laying member 2 will be driven faster than will the track laying member 1, hence the machine will be steered toward the right.

If it be desired to steer the machine toward the left, either of the above methods may be employed by clutching the proper gears to the shafts 16 and 15, as will be well understood.

The shaft 27 may be driven in any desired manner, and while I have shown and will describe a mechanism by which this may be done, it will be understood that the invention is in no way limited thereby.

The shaft 27 is extended as indicated at 27ª, and upon this shaft there is loosely mounted a gear 30 which has a clutch member 31 attached thereto. The operating clutch member 32 is keyed upon the shaft 27ª, and when moved toward the clutch member 31 it will cause the same to expand, and thereby attach the gear 30 to the shaft 27ª. At the opposite end of the shaft there is a sprocket wheel 33 and associated with it is a clutch 34 which is in position to be expanded by means of the clutch operating member 32, as has been previously explained.

The sprocket member 33 is normally free to rotate on the shaft. There is also a shaft 35 which has bearings in portions of the frame 10 and this shaft at its central portion has a sprocket wheel 36 by which the shaft is driven from some suitable source of power. On this shaft and drivingly attached thereto is a gear 37 which meshes with the gear 30. Therefore when the gear 30 is clutched to the shaft 27ª the gear 37 will drive the same in part motion to the shaft 27ª which will in turn drive the shaft 27. There is also upon the shaft 35 a sprocket 38 which, by means of a chain 39 is connected with the sprocket 33. When the sprocket 33 is clutched to the shaft 27ª the shaft 27 will be driven by means of the sprockets 38 and 33 and the connecting chain.

It is preferred to secure the main drive by means of the sprockets 38 and 33, and the chain 39, and when it is desired to reverse the driving mechanism so that the track laying members 1 and 2 will be driven in a direction to cause the vehicle to back, the clutch 34 is released and the clutch 34 is brought into operation so as to cause a driving relation between the gears 37 and 30 for the purpose of driving the shaft 27ª in the reverse direction.

This mechanism is exceedingly simple, and may be readily operated by means of levers for moving the clutch operating members 23, 23ª and 32, all in a manner which is well understood in the art, and requires no extended illustration here.

Having described my invention, I claim:—

1. In a track laying vehicle, the combination of a pair of oppositely disposed endless track members, a pair of parallel shafts, a connection between each of said shafts and one of the track laying members, two gears of different diameters and number of teeth loosely mounted upon each of said shafts, the gears on each of the shafts of similar size and number of teeth being oppositely mounted with respect to each other, an intermediate shaft, a plurality of gears fixedly mounted upon said shaft each of said gears being arranged to be in mesh with oppositely disposed gears upon the first mentioned shafts, clutch mechanism associated with each of the gears on the first mentioned pair of shafts whereby selected gears on each of the first mentioned pair of shafts may be clutched to its shaft, a pair of members rotatably mounted upon said intermediate shaft, means for driving said members in opposite directions, and means for clutching either of said members to the shaft whereby said track laying members may be driven at different speeds in either direction.

2. In a track laying vehicle, the combination of a pair of oppositely disposed endless track members, a pair of parallel shafts, a driving connection between each parallel shaft and one of the truck members, a plurality of gears of different diameters and numbers of teeth loosely mounted upon each of said parallel shafts, an intermediate shaft, a plurality of gears which are fixedly carried by said intermediate shaft each gear being in mesh with a pair of oppositely disposed gears upon the said parallel shafts, and clutch mechanism associated with each of said gears on the first mentioned pair of shafts whereby a selected gear on each of said shafts may be clutched to the shaft on which it is mounted, a gear loosely mounted on said intermediate shaft, a sprocket loosely mounted upon said intermediate shaft, means for clutching either the sprocket or the gear to the shaft, a drive shaft parallel with the intermediate shaft, a gear fixed to the drive shaft and meshing with the gear on the intermediate shaft, a sprocket fixed to the drive shaft, and a chain connecting the two sprockets.

In testimony whereof, I hereunto affix my signature.

JOSEPH H. MOSEL.